Oct. 5, 1965 S. J. WILLIAMS ETAL 3,210,653
DISTRIBUTOR TESTING MACHINE INCLUDING
ROTATING DEFLECTION COILS
Filed Oct. 16, 1961 2 Sheets-Sheet 1

Stanley James Williams
Karl Heinz Krueger
Gordon Alec Peters
INVENTORS

BY Ooms McDougall
and Hersh
Att'ys

Oct. 5, 1965 S. J. WILLIAMS ETAL 3,210,653
DISTRIBUTOR TESTING MACHINE INCLUDING
ROTATING DEFLECTION COILS
Filed Oct. 16, 1961 2 Sheets-Sheet 2
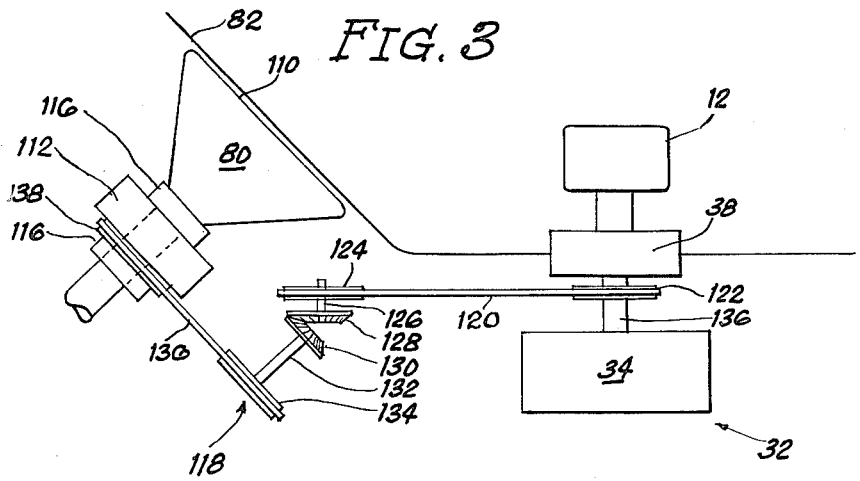
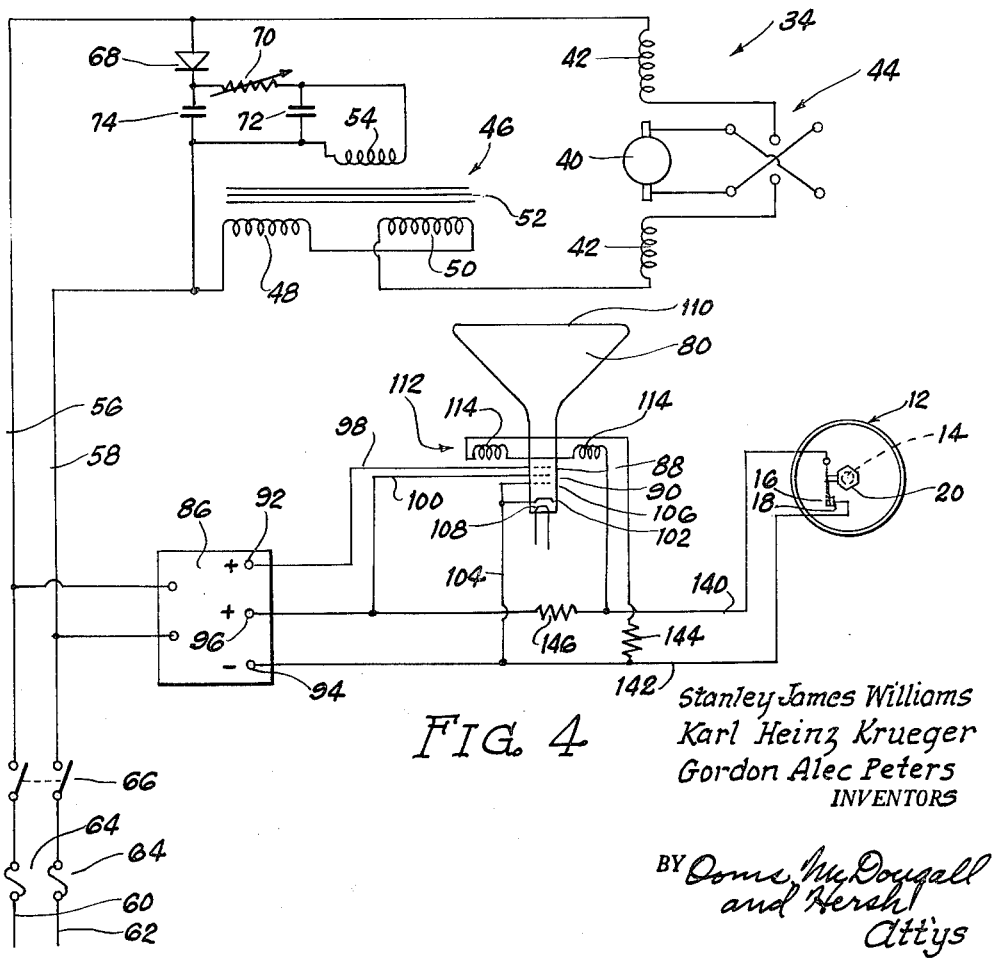
Stanley James Williams
Karl Heinz Krueger
Gordon Alec Peters
INVENTORS United States Patent Office 3,210,653
Patented Oct. 5, 1965

3,210,653
DISTRIBUTOR TESTING MACHINE INCLUDING ROTATING DEFLECTION COILS
Stanley James Williams, Karl Heinz Krueger, and Gordon Alec Peters, all of London, Ontario, Canada, assignors to American Gage & Machine Company, Chicago, Ill., a corporation of Illinois
Filed Oct. 16, 1961, Ser. No. 145,350
6 Claims. (Cl. 324—16)

This invention relates to a new and improved machine for testing ignition distributors of the type having a shaft which is provided with a cam adapted to open and close a pair of breaker points.

One principal object of the present invention is to provide a new and improved distributor testing machine having a cathode ray tube adapted to provide a segmented circular display which will show very graphically the performance of the distributor, and particularly the intervals during which the breaker points are open and closed.

A further object is to provide a new and improved distributor testing machine of the foregoing character in which the display produced by the cathode ray tube is in the form of a circular trace which is synchronized with the rotation of the shaft of the distributor and is changed in radius by the opening and closing of the distributor points.

It is another object to provide a new and improved distributor testing machine in which the circular trace is produced by a deflection yoke which is rotated in synchronism with the rotation of the distributor shaft.

A further object is to provide a new and improved distributor testing machine which makes it easy to measure not only the timing angle of the distributor and the angle of dwell, but also any bouncing, jittering or other malfunctioning of the breaker points or other components of the distributor.

Further objects and advantages of the present invention will appear from the following description, taken with the accompanying drawings, in which:

FIG. 3 is a diagrammatic elevational section showing the driving mechanism for the distributor and the deflection yoke of the cathode ray tube.

FIG. 4 is a schematic circuit diagram of the distributor testing machine.

Figure 1:
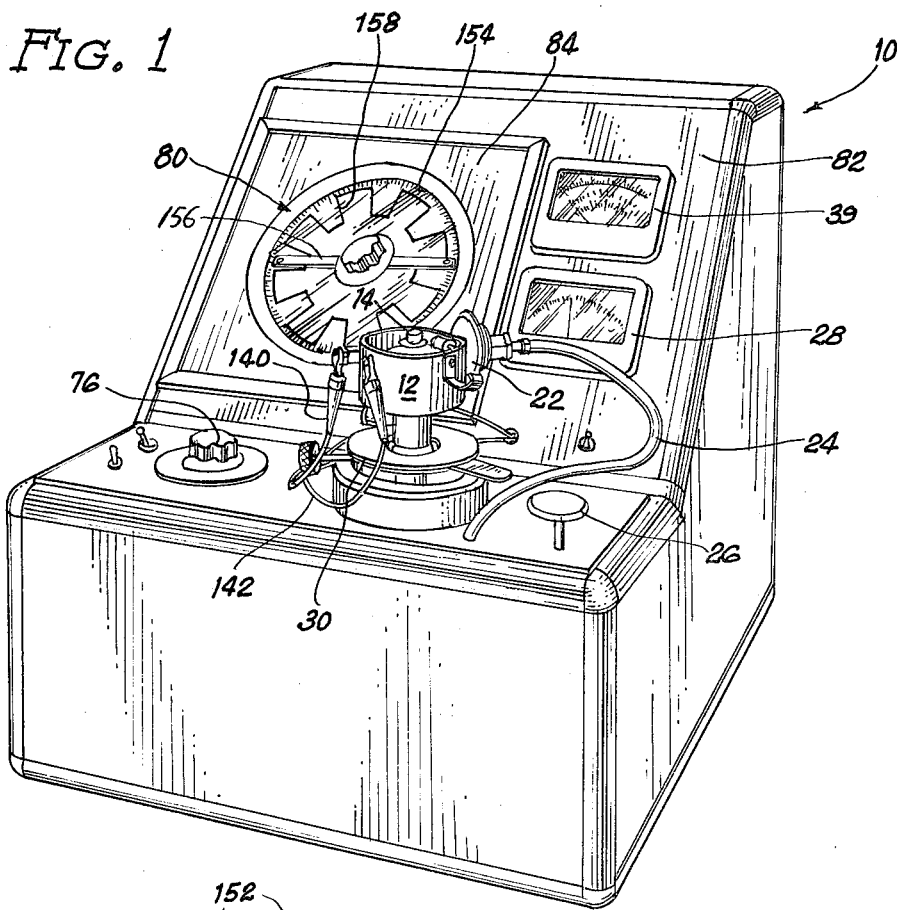
FIG. 1 is a perspective view of a distributor testing machine to be described as an illustrative embodiment of the present invention.

As already indicated, FIG. 1 illustrates a machine 10 adapted to test distributors. It will be seen that a distributor 12 is mounted on the machine 10. The distributor 12 is of the type having a shaft 14 adapted to open and close a pair of breaker points 16 and 18. A cam 20 is provided on the shaft 14 to operate the breaker points. Distributors of this type are commonly employed in the ignition systems of automotive engines and other internal combustion engines.

The illustrated distributor 12 is provided with a vacuum spark control mechanism 22 adapted to shift the position of the breaker points 18, relative to the cam 20, in response to changes in the vacuum in the carburetor of the internal combustion engine. The distributor testing machine 10 may be provided with a vacuum pump (not shown) to provide a vacuum for checking the operation of the vacuum spark control mechanism 22. A hose 24 is provided to connect the vacuum pump to the vacuum control mechanism 22. A knob 26 may be provided to regulate the amount of vacuum. To measure the vacuum, a vacuum gauge 28 may be mounted on the distributor testing machine 10.

It will be seen that the machine 10 is provided with a clamp 30 adapted to hold the distributor 12 on the machine. A variable speed drive 32 is provided to operate the shaft 14 of the distributor. The speed of the drive 32 may be changed electrically, mechanically, or in any other suitable manner. As illustrated, the drive 32 comprises a variable speed electric motor 34 which drives a shaft 136. An adjustable chuck 38 is mounted on the end of the shaft 136 and is adapted to receive the lower end of the distributor shaft 14 so that the distributor shaft will be driven by the motor 34. A tachometer 39 may be provided on the machine 10 to indicate the speed of the distributor shaft.

Any suitable arrangement may be employed to vary the speed of the motor 34. In this case, the motor 34 is of the universal series field type adapted to operate on either direct or alternating current. Thus, the motor 34 comprises an armature 40 and series field coils 42. A reversing switch 44 is provided to reverse the polarity of the connections to the armature 40 so that the motor may be caused to operate in either direction.

The speed of the motor 34 is varied by means of a saturable reactor 46 having windings 48 and 50 connected in series with the motor. The reactor 46 has a saturable core 52 and a winding 54 through which direct current may be passed to vary the degree of saturation of the core. As the saturation of the core is increased, the impedence of the windings 48 and 50 is reduced so that the speed of the motor will be increased.

The motor 34 is energized from a pair of leads 56 and 58 which may be connected to a pair of alternating current power lines 60 and 62 through fuses 64 and a switch 66.

Variable direct current to energize the winding 54 is provided by a rectifier 68 and a variable resistor 70 which are connected in series with the winding 54 across the leads 56 and 58. A filtering capacitor 72 may be connected across the winding 54. In this case, a second filtering capacitor 74 is connected from the junction of the rectifier 68 and resistor 70 to the lead 58. With this arrangement, the speed of the motor 34 is changed by varying the resistance of the variable resistor 70. The resistor 70 may be operated by means of a control knob 76 on the distributor testing machine.

To indicate the manner in which the distributor is operating, the distributor testing machine 10 is provided with a cathode ray tube 80 which is mounted behind an inclined front panel 82 on the machine. A protective window 84 may be provided in front of the tube 80.

The cathode ray tube 80 may be energized by a conventional power supply 86 connected to the alternating current power leads 56 and 58. Thus, the power supply 86 produces a high direct voltage to energize the second anode 88 of the tube 80 and a relatively low voltage to energize the first anode 90. The high voltage appears across a positive output terminal 92 and a negative terminal 94 on the power supply 86. The low voltage appears across a positive terminal 96 and the negative terminal 94. A lead 98 extends between the high voltage terminal 92 and the second anode 88. Similarly, a lead 100 is connected between the low voltage terminal and the first anode 90. The cathode 102 of the tube 80 is connected to the negative terminal 94 by a lead 104. In this case, the control electrode 106 of the tube 80 is connected to the cathode 102. The power supply 86 may also be provided with means to energize the heater 108 of the cathode ray tube 80. When the cathode ray tube 80 is energized, it generates an electron beam which produces a spot on the fluorescent screen of face 100 of the tube. The beam is adapted to be deflected by means of a deflection yoke 112, which may be of the electrostatic type, but is illustrated as being of the magnetic type, comprising deflection coils 114.

In accordance with the present invention, the deflection yoke 112 is mounted for rotation about the axis of the cathode ray tube 80. As shown in FIG. 3, the deflection yoke 112 may be mounted on bearings 116.

When the deflection yoke 112 is energized, the electron beam is deflected radially from the center of the screen 110. If the yoke 112 is rotated, the electron beam produces a circular trace on the screen 110. The radius of the trace depends upon the current through the deflecting coils 114.

The variable speed drive 32 comprises means for driving the deflection yoke 112 in synchronism with the shaft 14 of the distributor 12. In this case, a driving mechanism 118 is connected between the motor 34 and the deflection yoke 112. The drive mechanism 118 comprises a toothed belt or chain 120 connected between sprockets 122 and 124. The sprocket 122 is secured to the motor shaft 136, while the sprocket 124 is secured to a shaft 126. A bevel gear 128 is mounted on the shaft 126 and is arranged to mesh with a bevel gear 130 on an inclined shaft 132, which is parallel to the axis of the cathode ray tube 80. A sprocket 134 is mounted on the shaft 132. It will be seen that a second toothed belt or chain 136 is connected between the sprocket 134 and a sprocket 138 on the deflection yoke 112. It will be understood that the arrangement of the drive mechanism may be varied as desired, so long as the deflection yoke is driven in synchronism with the distributor shaft.

In order to produce the segmented circular trace on the tube 80, the deflection yoke 112 is energized under the control of the breaker points 16 and 18 of the distributor. In this case, the relatively low voltage between the terminals 96 and 94 is employed to energize the deflection coils 114. A pair of test leads 140 and 142 are connected to the breaker point terminals of the distributor. These leads are connected in series with the deflection coils 114. A resistor 144 may be connected between the leads 140 and 142 to provide a minimum deflection current through the coils 114 when the breaker points are open. A second resistor 146 may be connected in series with the deflection coils 114 to regulate the current through the coils when the breaker points are closed.

Figure 2:
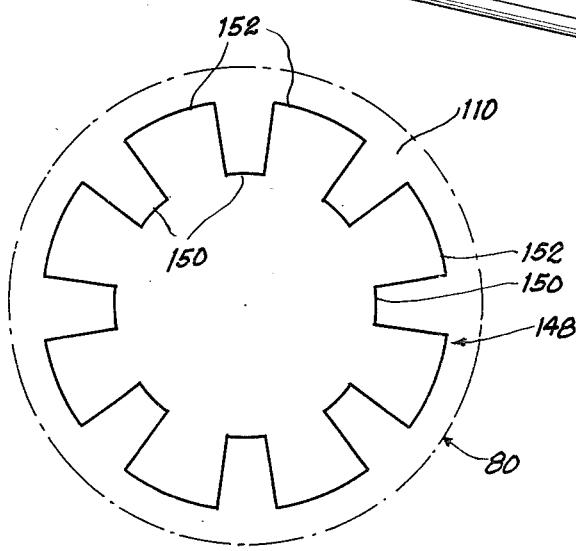
FIG. 2 is a somewhat diagrammatic view showing the face of the cathode ray tube employed in the distributor testing machine and illustrating the segmented circular trace produced by the tube when the machine is in operation.

Thus, when the breaker points are open, the electron beam is deflected to a relatively small radius. When the breaker points are closed, the electron beam is deflected to a greater radius, to produce the segmented circular trace 148 as shown to best advantage in FIG. 2. The opening and closing of the breaker points produces the inner and outer segments 150 and 152 of the trace 148. The length of each outer segment 152 indicates the angle of dwell of the breaker points for each lobe of the distributor cam. Thus, the dwell angle of each lobe may be checked separately to determine whether all of the dwell angles are equal. Any change in the timing of the distributor causes the entire pattern or trace 148 to rotate on the screen 110 of the cathode ray tube 80. Thus, the effect of the vacuum spark control mechanism may readily be measured. By varying the speed of the distributor shaft, the effect of the centrifugally operated spark advance may also be checked.

A circular protractor 154 may be provided in front of the screen 110 of the tube to facilitate the measurement of the dwell angles and the timing angles. The protractor 154 may be rotatably mounted on the window 84. A rotatable index blade 156 may also be mounted on the window 84 in front of the cathode ray tube to serve as a reference against which any change in the timing angle may be checked. A pattern 158, representing a typical trace, may be printed on the window 84, or on the protractor 154, for comparison with the actual trace produced by the cathode.

It will be evident that any bounce of the breaker points 16 will cause irregularities in the trace 148. Thus, any bounce may readily be observed and measured. This is also true of any jitter or oscillation of the timing angles at which the breaker points open and close. Any such jitter will cause the trace 148 to shift in its angular position about the axis of the tube. Such factors as a bent or worn distributor shaft, worn distributor shaft bearings, and looseness or play in the operating parts of the distributor will cause characteristic changes in the trace or pattern on the cathode ray tube. Thus, the distributor testing machine produces a very graphic picture of the condition of the distributor under test. The machine makes it easy to adjust the distributor, and indicates clearly whether the distributor needs to be overhauled or replaced.

Various modifications, alternative constructions and equivalents may be employed without departing from the true spirit and scope of the invention, as exemplified in the foregoing description and defined in the following claims.

We claim:

1. In a distributor testing machine, the combination comprising means for driving the shaft of a distributor, a cathode ray tube, deflection coils mounted for rotation about the axis of said cathode ray tube, means for driving said deflection coils in synchronism with the shaft of the distributor, the rotation of the deflection coils causing said cathode ray tube to display a circular trace when said coils are energized, and means for energizing said coils through the breaker points of the distributor so that the opening and closing of the breaker points will divide the circular trace into a plurality of segments.

2. In a machine for testing distributors of the type having a shaft provided with means adapted to open and close a pair of breaker points, the combination comprising a cathode ray tube, a deflection yoke mounted for rotation about the axis of said cathode ray tube, the rotation of said yoke being effective to cause the cathode ray tube to display a circular trace when said yoke is energized, means for holding a distributor to be tested, means for driving the shaft of the distributor, means for driving the deflection yoke in synchronism with the shaft of the distributor, and means for energizing said deflection yoke through the breaker points so that the opening and closing of the breaker points will change the radius of the circular trace on the tube.

3. In a machine for testing a distributor of the type having a shaft provided with means adapted to open and close a pair of breaker points, the combination comprising a cathode ray tube, a deflection yoke rotatable about the axis of said tube, the rotation of said yoke causing the tube to display a circular trace when the yoke is energized, a variable speed drive comprising a motor, means operable by said motor for driving the shaft of the distributor, means operable by said motor for driving the deflection yoke in synchronism with the shaft of the distributor, and means for energizing the deflection yoke in response to the closing of the breaker points so that the opening and closing of the breaker points will change the radius of the circular trace and thus will divide the trace into a plurality of segments.

4. In a machine for testing a distributor of the type having a shaft provided with means adapted to open and close a pair of breaker points, the combination comprising a cathode ray tube, a deflection yoke rotatable about the axis of said tube, the rotation of said yoke causing the tube to display a circular trace when the yoke is energized, a drive including means for driving the shaft of the distributor and means for driving the deflection yoke in synchronism with the shaft, and means for energizing the deflection yoke in response to the closing of the breaker points so that the opening and closing of the breaker points will divide the circular trace into a plurality of segments.

5. In a machine for testing a distributor of the type having a shaft provided with a cam adapted to open and close a pair of breaker points, the combination comprising a cathode ray tube, deflection coils rotatable about the axis of said tube, the rotation of said yoke causing the tube to display a circular trace when the yoke is energized, a drive including means for driving the shaft of the distributor and means for driving the deflection coils in synchronism with the shaft, and means for energizing the deflection coils through the breaker points so that the opening and closing of the breaker points will divide the circular trace into a plurality of segments.

6. In a machine for testing a distributor of the type having a shaft adapted to open and close a pair of breaker points, the combination comprising a cathode ray tube, a deflection yoke rotatable about the axis of said tube, the rotation of said yoke causing the tube to display a circular trace when the yoke is energized, a drive including means for driving the shaft of the distributor and means for driving the deflection yoke in synchronism with the shaft, and means for controlling the energization of the deflection yoke in response to the opening and closing of the breaker points so that the opening and closing of the breaker points will divide the circular trace into a plurality of segments.

References Cited by the Examiner

UNITED STATES PATENTS 3,020,541  2/62  Dickey _____ 315—25 X

OTHER REFERENCES

Scope Competitive Analysis Chart, Heyer Industries Incorporated, pp. 1–11, dated August 1, 1958.

WALTER L. CARLSON, *Primary Examiner.*